US010369825B2

(12) United States Patent
Osadchyy et al.

(10) Patent No.: US 10,369,825 B2
(45) Date of Patent: Aug. 6, 2019

(54) SYSTEMS AND METHODS FOR SUPPLY QUALITY MEASUREMENT (71) Applicant: KYOCERA Document Solutions Inc., Osaka (JP)

(72) Inventors: Oleksandr Osadchyy, Concord, CA (US); Tetsuji Yamaguchi, Concord, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 238 days.

(21) Appl. No.: 15/614,854

(22) Filed: Jun. 6, 2017

(65) Prior Publication Data
US 2018/0345703 A1 Dec. 6, 2018

(51) Int. Cl.
B41J 29/393 (2006.01)
B41F 33/00 (2006.01)
B41F 33/02 (2006.01)

(52) U.S. Cl.
CPC ............ B41J 29/393 (2013.01); B41F 33/00 (2013.01); B41F 33/0063 (2013.01); B41F 33/025 (2013.01); B41P 2233/30 (2013.01)

(58) Field of Classification Search
CPC ..... B41J 29/393; B41F 33/00; B41F 33/0063; B41F 33/025; B41P 2233/30
See application file for complete search history.

(56) References Cited

U.S. PATENT DOCUMENTS

| 6,633,732 | B2 | 10/2003 | Siegel et al. | |
| 8,000,615 | B2 | 8/2011 | Mizuyama | |
| 2011/0071866 | A1* | 3/2011 | Handley | G03G 21/02 705/7.27 |
| 2016/0078513 | A1* | 3/2016 | Goswamee | G06Q 10/06 705/26.41 |
| 2017/0143843 | A1* | 5/2017 | Hass | C07K 16/2863 |

* cited by examiner

Primary Examiner — Huan H Tran
(74) Attorney, Agent, or Firm — McDonnell Boehnen Hulbert & Berghoff LLP (57) ABSTRACT Example systems and related methods may provide improved defect detection and resolution for a plurality of printing devices. An example method includes receiving information indicative of at least one aspect of a printing device from among a plurality of printing devices. The plurality of printing devices is communicatively coupled to a server. Each printing device of the plurality of printing devices includes a sensor configured to provide information indicative of at least one aspect of the respective printing device. The method also includes, based on the received information, accumulating, at the server, historical data corresponding to the at least one aspect of the plurality of printing devices. The method yet further includes comparing the accumulated historical data with model reference data. The method additionally includes, based on the comparison, determining highlighted data and causing a display device to display the highlighted data.

20 Claims, 10 Drawing Sheets

SYSTEMS AND METHODS FOR SUPPLY QUALITY MEASUREMENT

BACKGROUND

Conventional printing devices may undergo extensive internal testing prior to a public product launch. Additionally or alternatively, some printing devices may be gradually released to customers in phased public evaluation cycles. Such internal and external testing may be performed, at least in part, to avoid mass-production of a defective product.

SUMMARY

Example embodiments described herein relate to systems and methods for utilizing historical data from a plurality of printing devices to better interpret error cases and reduce overall downtime for the plurality of printing devices.

In a first aspect, a system is provided. The system includes a server, a display device, and a plurality of printing devices communicatively coupled to the server. Each printing device of the plurality of printing devices includes a sensor configured to provide information indicative of at least one aspect of the respective printing device. The system also includes a controller having at least one processor and a memory. The at least one processor executes instructions stored in the memory so as to carry out operations. The operations include receiving, at a quality measurement service, information indicative of the at least one aspect of the respective printing device from at least a portion of the plurality of printing devices. The operations also include, based on the received information, accumulating historical data corresponding to the at least one aspect of the plurality of printing devices. The operations yet further include comparing the accumulated historical data with model reference data. Additionally, the operations include, based on the comparison, determining highlighted data. The operations further include causing the display device to display the highlighted data.

In a second aspect, a method is provided. The method includes receiving information indicative of at least one aspect of a printing device from among a plurality of printing devices. The plurality of printing devices is communicatively coupled to a server and each printing device of the plurality of printing devices includes a sensor configured to provide information indicative of at least one aspect of the respective printing device. The method also includes, based on the received information, accumulating, at the server, historical data corresponding to the at least one aspect of the plurality of printing devices. The method additionally includes comparing the accumulated historical data with model reference data, and, based on the comparison, determining highlighted data. The method further includes causing a display device to display the highlighted data.

In a third aspect, a method is provided. A method includes, during a quality assurance phase, receiving, at a quality measurement service, information indicative of at least one quality report corresponding to a respective printing device of a plurality of printing devices. The method also includes, based on the received information, accumulating historical quality report data corresponding to the plurality of printing devices. The method additionally includes receiving, at the quality measurement service, information indicative of at least one resolution corresponding to at least one quality report. The method yet further includes accumulating historical resolution data corresponding to the plurality of printing devices and comparing the historical quality report data to the resolution data. The method also includes, based on the comparison, determining a launch-to-market condition and, in response to determining the launch-to-market condition, initiating an operational phase.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The present disclosure relates to systems and methods that may provide more accurate product information during the lifecycle of printing devices. The accuracy of supply levels reported by such printing devices is one criterion evaluated during such private and/or phased public testing. Namely, the printing devices may report supply levels of consumables such as, but not limited to, toner/ink, paper, and staples. Additionally or alternatively, the printing devices may report information regarding a wear condition of various components of the printing device, such as a fuser (in laser printers), one or more rollers, one or more drums, etc. The printing devices may report such information (regarding supply levels and/or wear condition) via a wired or wireless network connection. The information may be provided to a local server, a network server, or a cloud server.

In response to the supply level information, a supply shipment may be triggered to replenish consumables. In response to information about wear conditions, a service report or service visit may be triggered to repair or replace worn parts of the printing device.

Example embodiments relate to testing tools for improving printing device quality based on reports regarding supply levels and wear conditions. Such testing tools are described as example methods and systems herein. Namely, a quality measurement service may analyze the information from the printing devices for likely problems (e.g., an inaccurate or failing sensor). Furthermore, the quality measurement service may provide a supply replenishment service with historical data from the printing devices and may receive predicted replenishment timeframes and statistics data.

The quality measurement service may analyze the data from the printing device and the supply replenishment service. Based on such an analysis, the quality measurement service may provide at least two types of results. First, issues may be automatically detected based on previously identified issues/known problems. Second, the quality measurement service may provide statistical characteristics and/or visualization of the analyzed data for further analysis.

The systems and methods described herein may provide reduced internal testing before public release of a new printing device model, at least because supply level misreporting may be corrected by analyzing supply level information from many similar printing devices. As such, less internal testing may be needed before market entry. Furthermore, one or more adjustments may be applied globally with regard to a cloud server, such as with a software patch to adjust a variable, an offset, and/or an equation. In doing so, other users of similar printing devices need not experience similar misreporting issues. As a result, systems and methods described herein may reduce downtime in printing devices as compared to conventional defect resolution methods.

II. System Examples

Figure 1:
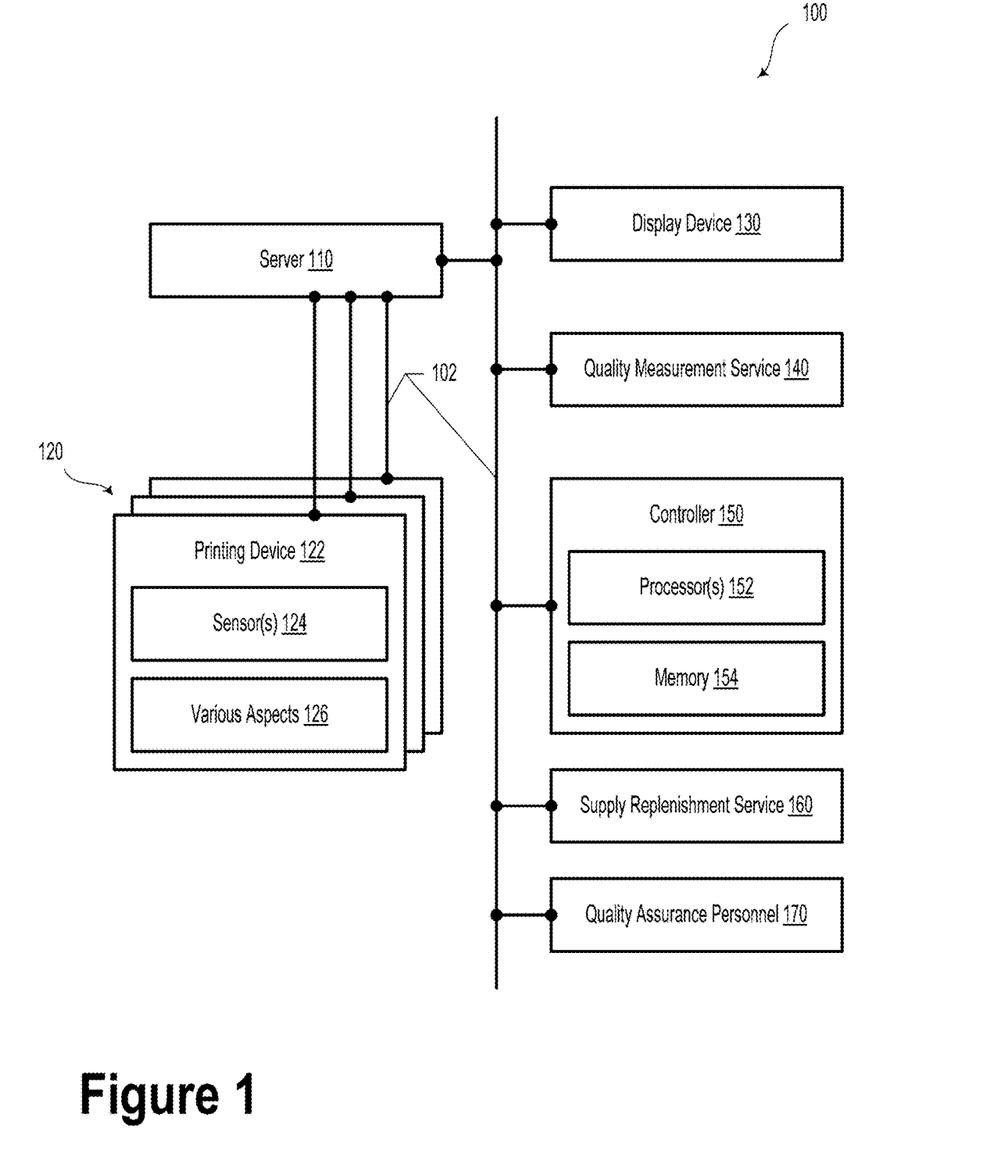
FIG. 1 is a schematic diagram illustrating a system, according to an example embodiment.

FIG. 1 is a schematic diagram illustrating a system 100, according to an example embodiment.

The system 100 may include a server 110. The server 110 may include one or more computers, which may be arranged in a computing network (e.g., a cloud computing network). The server 110 may be communicatively connected to other elements of system 100 via a communication interface 102. The communication interface 102 may include a wired network and/or a wireless network. In some embodiments, the communication interface 102 may be facilitated, at least in part, by the Internet or another type of distributed computing network.

The system 100 includes a display device 130. In an example embodiment, the display device 130 may be a computer monitor, a light-emitting diode (LED) display, a plasma display, a thin-film transistor (TFT) display, and/or another type of display configured to provide visual images and/or text to a viewer. Additionally or alternatively, the display device 130 may include a display of a mobile device (e.g., a smartphone, laptop, tablet, wearable device, head-mountable display, etc.). In some embodiments, the display device 130 may provide images and/or text to quality assurance personnel 170 or another type of user. In some embodiments, the display device 130 may be located at a quality assurance service department or another similar location.

The system 100 also includes a plurality of printing devices 120 communicatively coupled (e.g., via communication interface 102) to the server 110. The plurality of printing devices 120 may include printers, copiers, scanners, and/or multi-function devices (e.g., printer/scanner/copier devices). In an example embodiment, the plurality of printing devices 120 may include a group of devices having the same model or type. Additionally or alternatively, the plurality of printing devices 120 may include a group of devices having similar functions, features, release dates, sale dates, or other similar attributes. For instance, the plurality of printing devices 120 may include devices that accept the same type of toner cartridge. In other embodiments, the plurality of printing devices 120 need not include similar attributes and may include dissimilar printing devices Each of the plurality of printing devices 120 may be owned and/or operated by a customer (e.g., an individual, a business, etc.). In an example embodiment, each printing device (e.g., printing device 122) of the plurality of printing devices includes one or more sensors 124. The sensors 124 are configured to provide information indicative of at least one aspect 126 of the respective printing device 122.

The various aspects 126 of the printing device 122 could include, but are not limited to, a remaining toner level, an operational status, a printed page count, a paper tray level, a roller wear level, or a temperature of the printing device 122. Other aspects 126 could include CYMK ink level, drum/roller revolution counters, etc. It will be understood that many different aspects of the printing device 122 would be useful, from a quality assurance perspective, to predict and/or manage present or future operations of the printing device 122. Each such aspect is contemplated as a possibility within the context of the present disclosure. Furthermore, it will be understood that while certain aspects and embodiments of the present disclosure are described within the context of replenishment of printer toner, other types of replenishment and repair services are contemplated. For example, the method and systems described herein may be applied to shipments of paper or other consumables relating to printing devices, replacement parts (e.g., replacement rollers to replace worn-out rollers), service calls, etc. Such other embodiments are expressly contemplated herein. For example, the printing devices may provide their toner level (e.g., a percentage of full toner, an integer, a fraction, or another measurement unit), a counter (e.g., an accumulated number of pages printed, an accumulated number of pages fed, accumulated number of paper/toner reloads, incremental versions of such counters, etc.), a capacity (e.g., a maximum sheet capacity, sheet size type capacity, toner volume capacity, capacity for number of printed pages, etc.), or a coverage amount (e.g., the average number of dots per square inch per page, total number of dots per page, integrated coverage area, etc.).

The sensors 124 may include a toner level sensor, a page counter, a timer/clock, a drum wear sensor, a paper jam sensor, a feed rate sensor, or another type of sensor configured to provide information about the given printing device 122. In some embodiments, the sensors 124 may be configured to provide information about an operational status of the printing device 122. Additionally or alternatively, the sensors 124 may provide information about a consumable aspect of the printing device 122 and/or a maintenance aspect of the printing device 122.

It will be understood that sensors 124 may provide information by transducing one or more of a variety of physical phenomena within the context of the present disclosure. For example, the sensors 124 may include mechanical switches, pressure sensors, optical sensors, temperature sensors, or sensors configured to provide information by interpreting various electrical signals.

The system 100 also includes a controller 150 having at least one processor 152 and a memory 154. The at least one processor 152 executes instructions stored in the memory 154 so as to carry out a variety of operations described herein. It will be understood that the operations of controller 150 may be executed by a physical processor that resides with a first element of the system 100 (e.g., the quality measurement service 140) based on information received from a second element of the system 100 (e.g., the supply replenishment service 160).

The operations include receiving, at a quality measurement service 140, information indicative of the at least one aspect 126 of the respective printing device (e.g., printing device 122) from at least a portion of the plurality of printing devices 120.

In some embodiments, the sensors 124 may be configured to provide information indicative of a printing device toner level. In such scenarios, the operations may include determining, based on an analysis of the historical data, a toner level measurement error condition and, in response to determining the toner level measurement error condition, determining a corrective action. For example, the corrective action may be configured to correct the toner level measurement error condition. As such, the operations may include causing the server 110 to distribute a patch to at least a target portion of the printing devices 120. The patch may be operable to carry out the corrective action among the target portion of printing devices 120.

In an example embodiment, the quality measurement service 140 could include computational resources (e.g., a cloud computing network or another type of computing device) configured to aggregate, accumulate, manipulate, and/or compare information regarding various aspects 126 of the plurality of printing devices 120. In such scenarios, the quality measurement service 140 may provide various ways to reduce downtime and improve user experiences with regard to the plurality of printing devices 120. In an example embodiment, the quality measurement service 140 may provide more accurate information about toner usage, wear rates, maintenance needs, etc., for a given printing device 122 based on information obtained from printing devices with similar usage, similar hardware configuration, similar location, or another type of similarity.

The operations also include, based on the received information, accumulating historical data corresponding to the at least one aspect 126 of the plurality of printing devices 120. In some embodiments, the accumulated historical data may be stored permanently or temporarily in the memory 154 or elsewhere (e.g., within a cloud memory storage) so as to be accessed by the controller 150.

The operations further include comparing the accumulated historical data with model reference data. In some embodiments, the model reference data may be simulated or modeled data that may be generated for a given printing device 122 so as to provide extrapolated and/or predictive information about the given aspect 126 of the printing device 122. The model reference data may be generated, at least in part, based on training data, as described below.

The operations yet further include, based on the comparison between the accumulated historical data and the model reference data, determining highlighted data. The highlighted data may include a portion of the compared data that could be highly similar and/or highly dissimilar. For example, the highlighted data could be determined as such so as to provide evidence that a given printing device 122 is likely to perform in a similar manner as a given portion of the plurality of printing devices 120. In a specific example, the highlighted data could include a visual representation of similar toner level data. Additionally or alternatively, the highlighted data could include a visual representation of dissimilar toner level data.

In such a scenario, the operations may also include causing the display device 130 to display the highlighted data. For example, the highlighted data could be provided, via the display device 130 for viewing by quality assurance personnel 170. For instance, the highlighted data could be presented in a different color, size, line width, or line type as other data presented on the display device 130. As such, the quality assurance personnel 170 may be able to more quickly determine whether action is required with regard to a given printing device.

The quality assurance personnel 170 may decide on whether predicted or historical error cases apply to information received from a given printer device 122. Furthermore, the quality assurance personnel 170 may be able to override automatic shipments and/or initiate shipments of a consumable (e.g., an extra shipment of toner based on anticipated need or an increased toner usage rate).

For example, in some embodiments, the quality assurance personnel 170 could additionally be provided with one or more action options (e.g., initiate toner shipment, recall toner shipment, initiate service visit, etc.) that could be selected based on his or her analysis of the presented highlighted data. Additionally or alternatively, the quality assurance personnel 170 might be provided with an option to take no present action (e.g., delay shipment, take no action, etc.). The quality assurance personnel 170 may select such options via a computer terminal and/or various user interface devices (e.g., mouse, keyboard, touch screen, voice command, gesture, etc.).

For example, in some embodiments, the operations may additionally include receiving information indicative of a shipment decision. The shipment decision could be provided based on a selection made by the quality assurance personnel 170 and/or based on an automatic trigger (e.g., toner level is below a threshold level, such as 5%).

In such a scenario, in response to the shipment decision, the operations may also include causing a supply replenishment service 160 to initiate a replenishment action. The supply replenishment service 160 may include supplies, warehouse and shipping infrastructure, and personnel for providing just-in-time replenishment and/or maintenance services for the plurality of printing devices 120.

Additionally or alternatively, some embodiments may include further operations, such as, receiving, from the supply replenishment service 160, information indicative of shipment decisions. In such scenarios, the shipment decisions may include a last replacement date corresponding to at least one aspect of each respective printing device. For example, the information about shipment decisions may include a shipment date, supply type (e.g., toner cartridge), and/or quantity (e.g., 5 toner cartridges).

In some embodiments, the operations may include partitioning the historical data into at least a training data set and a reference data set. In such a scenario, the training data set may include historical data accumulated prior to a threshold date. The threshold date is a date prior to the last replacement date (e.g., the date on which a prior replenishment shipment was initiated or delivered). Furthermore, the reference data set includes historical data accumulated on or after the threshold date. In some embodiments, the training data set may be used as an input to a pattern-recognition algorithm, a machine learning algorithm, and/or an artificial intelligence (AI) so as to identify specific trends, levels, time periods, and/or other aspects of the historical data that could lead to actionable information.

As an example, the operations may include, based on the training data set, determining a predicted replacement date. That is, the training data set could be analyzed so as to predict a date on which a replacement shipment (e.g., toner, paper) or maintenance action may be needed. In such a scenario, the operations may include comparing one or more actual shipment dates of the shipment decisions with the predicted replacement date. Based on the comparison, a shipment error condition and an error type may be determined. In response to determining the shipment error condition, the operations may also include adjusting at least one aspect of the supply replenishment service 160 based on the error type.

In some embodiments, adjusting at least one aspect of the supply replenishment service 160 may include determining a corrective action. The corrective action may be configured to reduce or eliminate a difference between one or more future shipment dates and corresponding predicted replacement dates. Namely, the corrective action may include causing the server 110 to distribute a patch to at least a target portion of the printing devices 120. The patch may include replacement software and/or hardware. The patch may be operable to carry out the corrective action among the target portion of printing devices 120.

In some cases, the corrective action may include at least one of: adjusting a toner level offset point, adjusting a toner level usage slope, adjusting a dot-counting multiplier, adjusting a counter bit resolution, adjusting a page coverage multiplier, or adjusting a color printing multiplier.

The controller 150 may be optionally configured to carry out further operations, which may include, based on the training data set, determining the model reference data. In such scenarios, comparing the accumulated historical data with the model reference data may include comparing the model reference data with the reference data set. Based on the comparison, a reference data error condition and an error type may be determined. In such cases, the highlighted data may correspond to the reference data error condition.

In some embodiments, the operations may further include comparing at least a portion of the historical data to a set of known measurement error patterns. The set of known measurement error patterns could include, for example, a D-shaped toner level shape or an L-shaped toner level shape. Determining the toner level measurement error condition is based on the comparison between the portion of the historical data and the set of known measurement error patterns.

In yet further embodiments, the operations may additionally or alternatively include determining unusual toner data from the historical data. In such cases, the highlighted data may include the unusual toner data. Put in other words, in response to determining unusual toner data or known measurement error patterns, systems and methods described herein may automatically highlight the determined condition for display and/or could take automatic action based on a specific type of unusual data or error pattern. For example, in response to determining a D-shaped toner level shape, systems and methods may include an automatic absolute offset or rate of change offset without user intervention. In other embodiments, quality assurance personnel may proactively choose to take such action in response to viewing the highlighted data.

Furthermore, in such scenarios, prior to causing the display device to display the highlighted data, the operations may include applying a prefilter to the unusual toner data. Among other possibilities, a noise removal unit may be used to apply the prefilter to the unusual toner data. In an example embodiment, the prefilter may adjust raw data so as to smooth data, remove spikes, remove dips, interpolate, extrapolate, or otherwise change raw data.

In some embodiments, the highlighted data may include a plurality of tiles. In such a scenario, at least a portion of the plurality of tiles may be representative of the prefiltered unusual toner data. In some embodiments, the tiles may be displayed as multiple windows or multiple display portions on the display device. In some embodiments, some or all of the tiles may be displayed as being overlaid on one another so as to aid in visual recognition of differences and/or similarities between the tiles. In other embodiments, the tiles may be displayed in an A-B arrangement (e.g., side-by-side comparison). Other arrangements of the displayed tiles are possible and contemplated herein.

Figure 2:
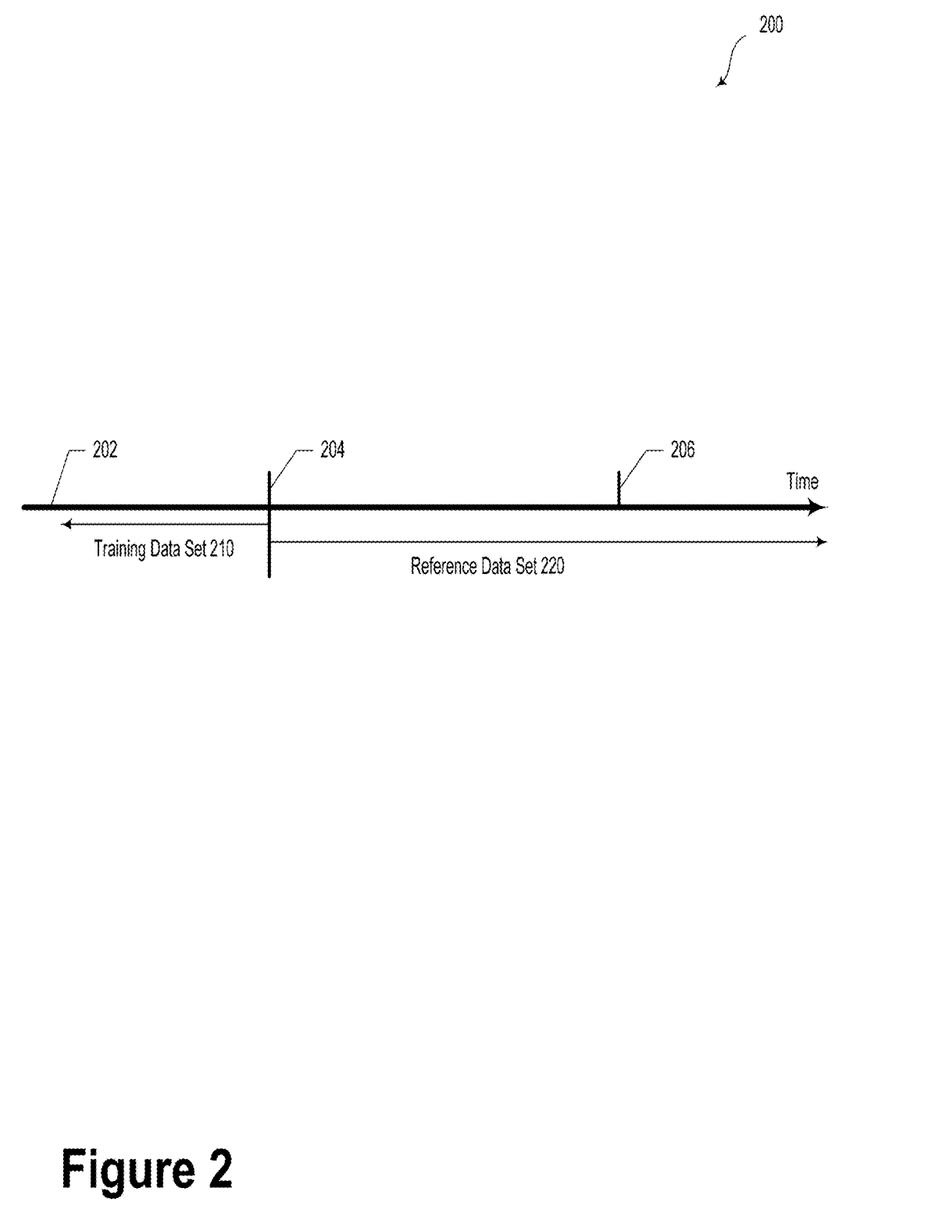
FIG. 2 is a schematic drawing illustrating a data partition, according to an example embodiment.

FIG. 2 is a schematic drawing illustrating a data partition 200, according to an example embodiment. As illustrated, the data partition 200 may include two portions of historical data 202 accumulated by the systems and methods described herein. Namely, the quality measurement service 140 may partition the accumulated historical data into a training data set 210, and a reference data set 220. The training data set 210 may be historical data from before a threshold date 204. The threshold date 204 may be a date and/or time prior to a last replacement date 206. The historical data 202 occurring after the threshold date 204 may be designated as reference data set 220.

Figure 3:
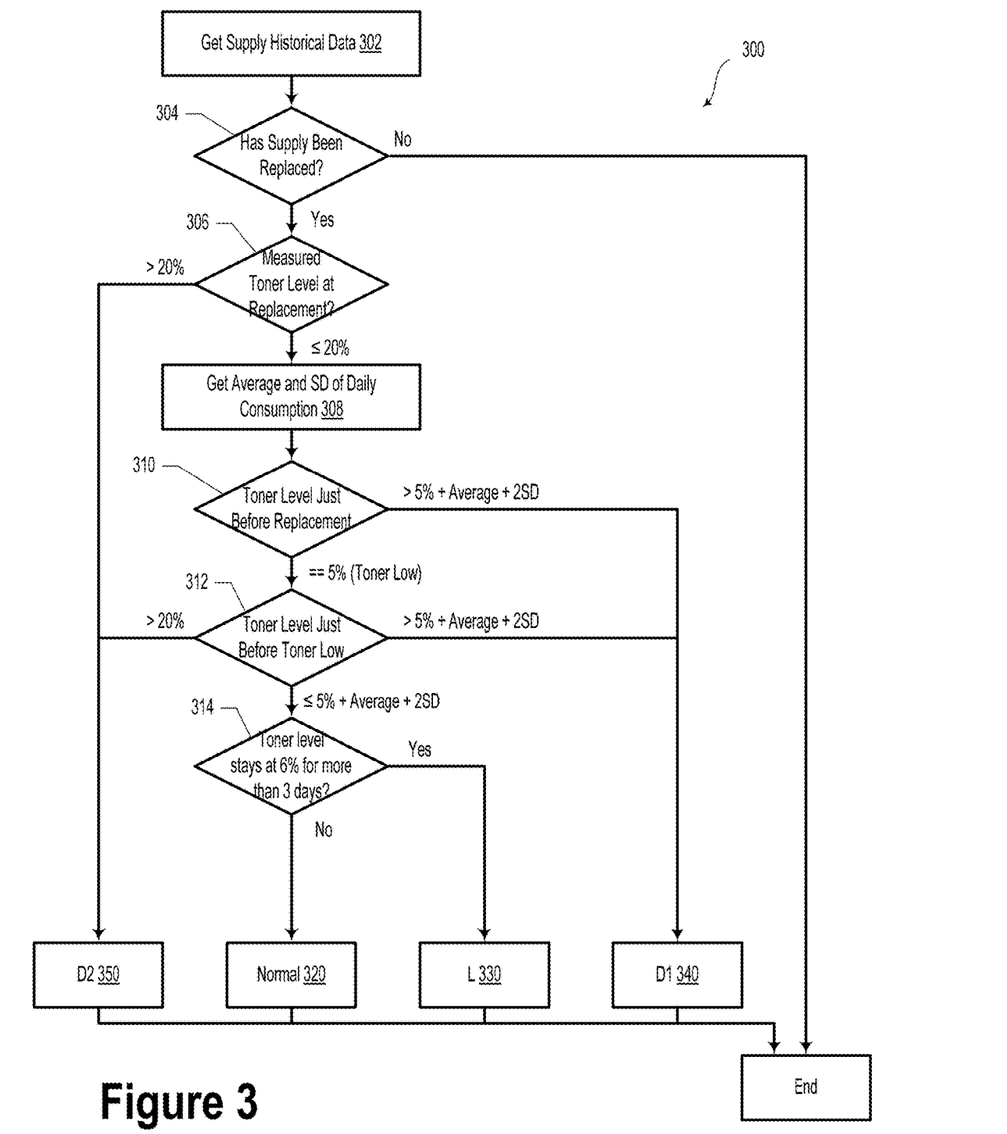
FIG. 3 illustrates a flowchart, according to an example embodiment.

FIG. 3 illustrates a flowchart 300, according to an example embodiment. Flowchart 300 includes various blocks and/or steps. In some embodiments, some blocks and/or steps of flowchart 300 may be skipped, deleted, added, or repeated. Flowchart 300 may provide, among other purposes, a way to group similar historical data together based on one or more attributes of the data. For example, historical data may be obtained 302 from a plurality of printing devices 120. Obtaining such data may include transmitting information indicative of the given aspects from a given printing device (e.g., printing device 122) to the quality measurement service 140.

Flowchart 300 includes a determination 304 as to whether a supply (e.g., a toner cartridge) has been replaced since last check. If not, the flowchart steps may end. If a supply has been replenished and/or replaced, a further determination 306 may be performed.

The further determination 306 is whether the measured toner level at the time of replacement was greater than 20% or less than or equal to 20% of toner cartridge capacity. If the measured toner level at the time of replacement was greater than 20%, the corresponding historical data may be categorized as being within category D2 350. If the measured toner level at replacement was less than or equal to 20% of toner cartridge capacity, the flowchart 300 may include obtaining the average and standard deviation of daily consumption of the consumable material 308 (e.g., average and standard deviation of daily toner usage over the previous month).

Flowchart 300 also includes a finer determination of the toner level just before the last toner cartridge replacement 310. Namely, if the toner level immediately before cartridge replacement was greater than (5%+the average daily toner usage+(2*the standard deviation of daily toner usage)), the historical data may be categorized as being within category D1 340. If the toner level immediately before the last cartridge replacement was equal to 5% (or another threshold at which a physical low toner level sensor may be triggered), then a further determination 312 may be conducted to determine the measured toner level at the time the physical low toner level sensor was triggered.

If, based on the further determination 312, the measured toner level was greater than 20%, the historical data may be categorized as being within category D2 350. Alternatively, if the measured toner level just before triggering the physical low toner level sensor was greater than (5%+the average daily toner usage+(2*the standard deviation of daily toner usage)), but less than or equal to 20%, then the corresponding historical data may be categorized as being within the category D1 340. Yet further, if the measured toner level was less than or equal to (5%+the average daily toner usage+ (2*the standard deviation of daily toner usage)), an additional determination 314 may be conducted.

The additional determination 314 may include whether the historical toner levels stayed above 6% for more than three days after the physical toner low level sensor was triggered. If so, the historical data may be categorized as being within category L 330. In other cases, if the toner level was not above the 6% normal threshold for more than three days after the physical toner low level sensor was triggered, thereafter the historical data may be categorized as being within category Normal 320.

Upon categorization of the historical data, the flowchart 300 may end. It will be understood that specific threshold levels provided in FIG. 3 and flowchart 300 are exemplary in nature only. That is, other threshold values are possible and other ways to categorize the historical data are possible.

Figure 4:
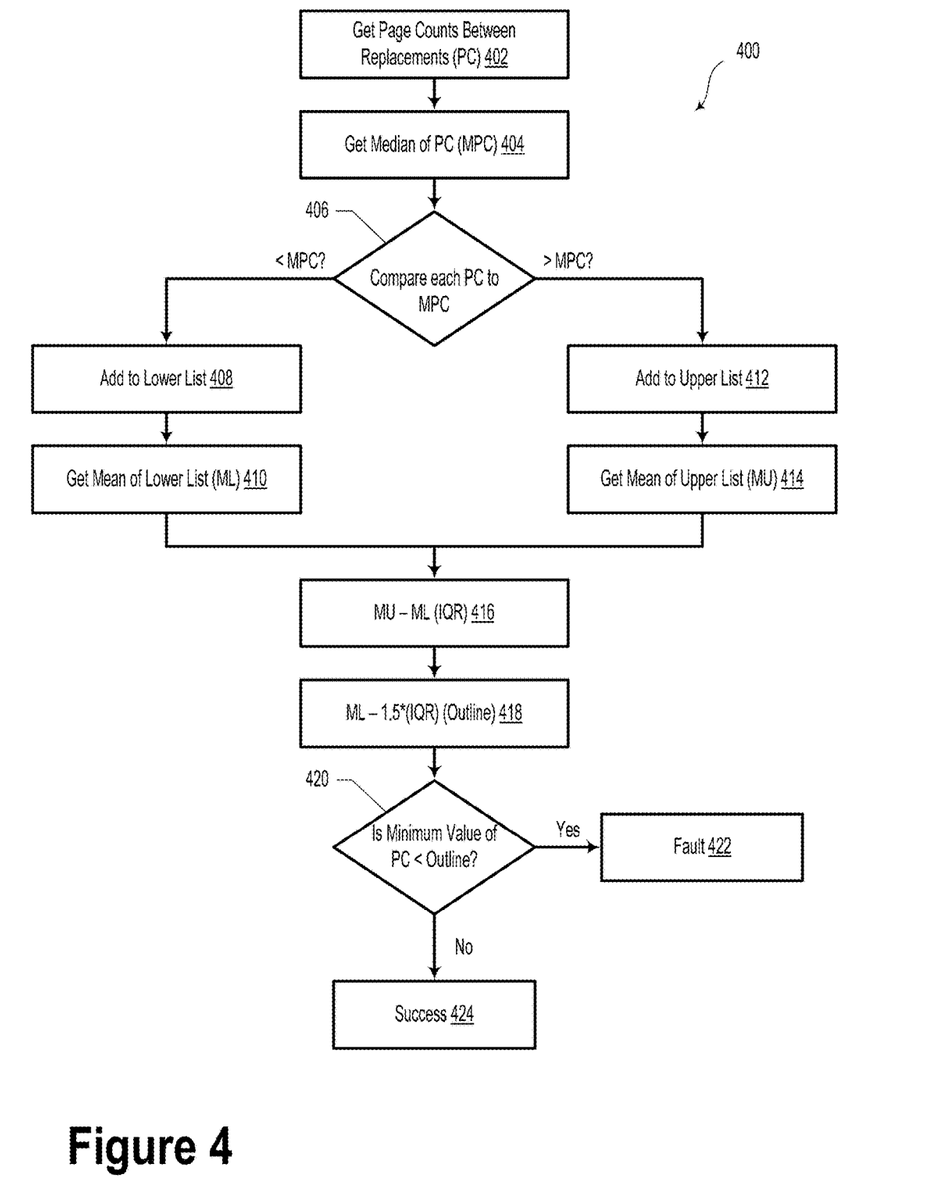
FIG. 4 illustrates a flowchart, according to an example embodiment.

FIG. 4 illustrates a flowchart 400, according to an example embodiment. Flowchart 400 includes various blocks and/or steps. In some embodiments, some blocks and/or steps of flowchart 400 may be skipped, deleted, added, or repeated. Flowchart 400 may include a way to determine whether a toner cartridge replacement was appropriately timed. The historical data utilized in flowchart 400 may include information from a single printing device, a plurality of similar printing devices (e.g., printing devices that use the same toner cartridge), or a plurality of similar and dissimilar printing devices (e.g., all printing devices of a given manufacturer).

Flowchart 400 may include obtaining a number of pages printed 402 (PC) between prior toner cartridge replacements. In other words, this is the actual or effective (using % page coverage) pages printed between toner cartridge replacements.

Additionally, the median of the PC value may be calculated (MPC) 404 over several cartridge replacement cycles. Subsequently, each PC value may be compared 406 to the MPC and categorized as being less than (or equal to) the MPC or greater than the MPC.

Based on the categorization, historical data relating to toner usage where the PC is less than the MPC may be added to a "lower" list 408. The flowchart 400 may include obtaining or calculating the mean of the lower list (ML) 410. Conversely, historical data corresponding to toner usage where the PC is greater than the MPC may be added to an "upper" list 412. The flowchart 400 may include obtaining or calculating the mean of the upper list (MU) 414.

In some embodiments, the flowchart 400 may include taking the difference 416 between MU and ML. In such cases, MU-ML may provide an interquartile range (IQR). In some embodiments, the IQR may represent, for example, a middle 50% or H-spread of a statistical distribution relating to the toner usage, print volume (e.g., the number of printed pages), % coverage of printed pages, or another aspect of the printing devices described herein. As part of an interquartile range method, the flowchart 400 may include subtracting 1.5*IQR from ML to obtain an outline value 418. By determining the outline value 418, a threshold value or range may be established from which to determine outlying data points (e.g., from malfunctioning printing devices, sensors, etc.).

The flowchart 400 may include a further determination 420 of whether a minimum value of PC is less than the outline value. If a given PC is less than the outline value, the corresponding historical data may indicate a fault condition 422. In such a scenario, a shipment of toner may have been shipped early or the toner cartridge may have been replaced before the prior cartridge was empty. In response to the fault condition 422, further steps such as issuing a patch having a correction algorithm may be carried out. Other corrective actions are possible. If the given PC is not less than the outline value, the corresponding historical data may indicate a normal (success) condition 424.

III. Method Examples

Figure 5A:
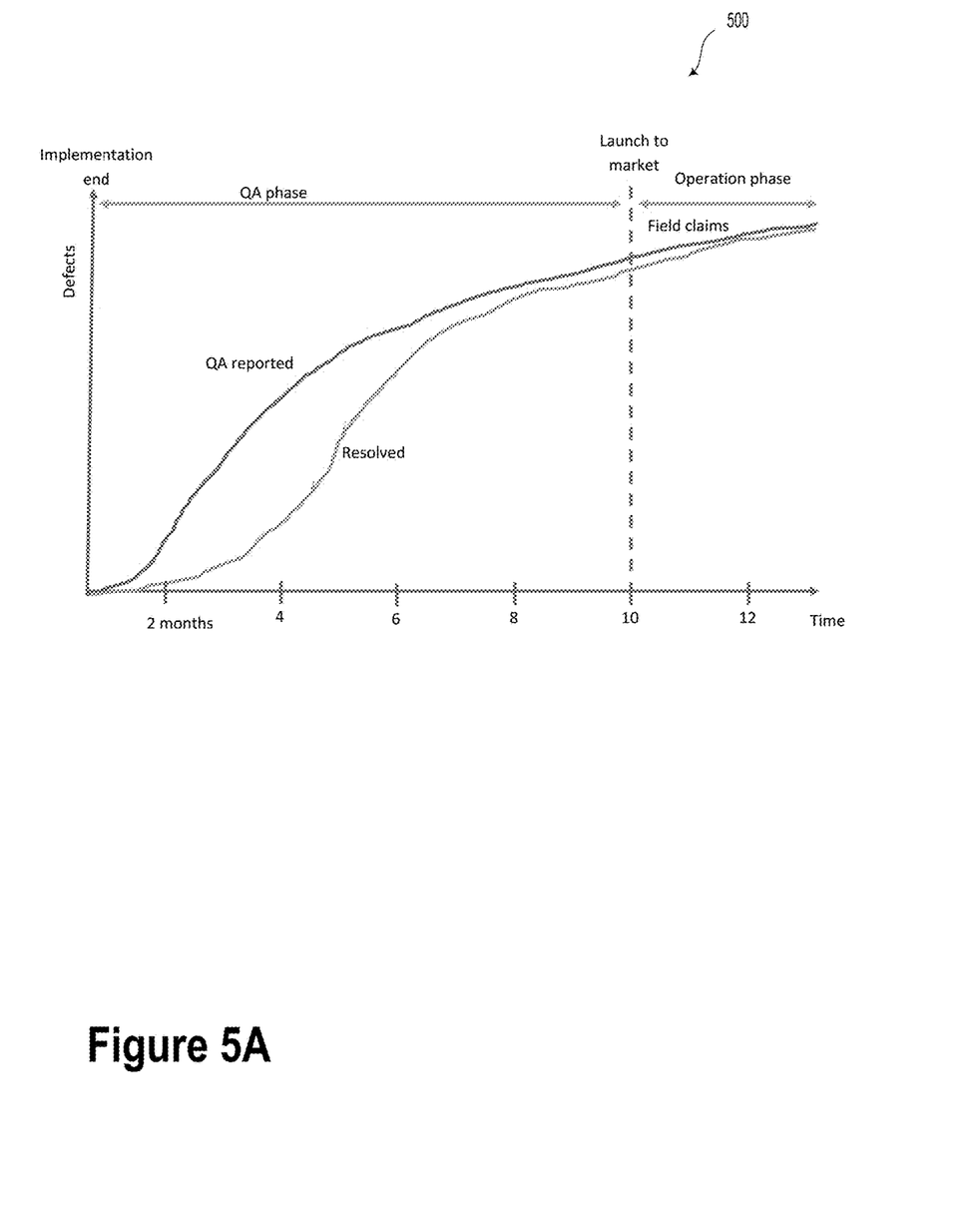
FIG. 5A illustrates a reported and resolved product defects versus time graph, according to an example embodiment.

FIG. 5A illustrates a reported and resolved product defects versus time graph 500, according to an example embodiment. For example, the graph 500 illustrates an aggregate amount of defects reported by quality assurance and an aggregate amount of defects resolved over time. As a general matter, a given product may be launched to the public and market at large when the number of defects and/or the type of defects decreases in number and/or severity. As illustrated in graph 500, in some examples, a quality assurance phase could take up to 10 months prior to entering into an operational phase. During the operational phase, defect reports could be received from the field (e.g., claims from customers).

Figure 5B:
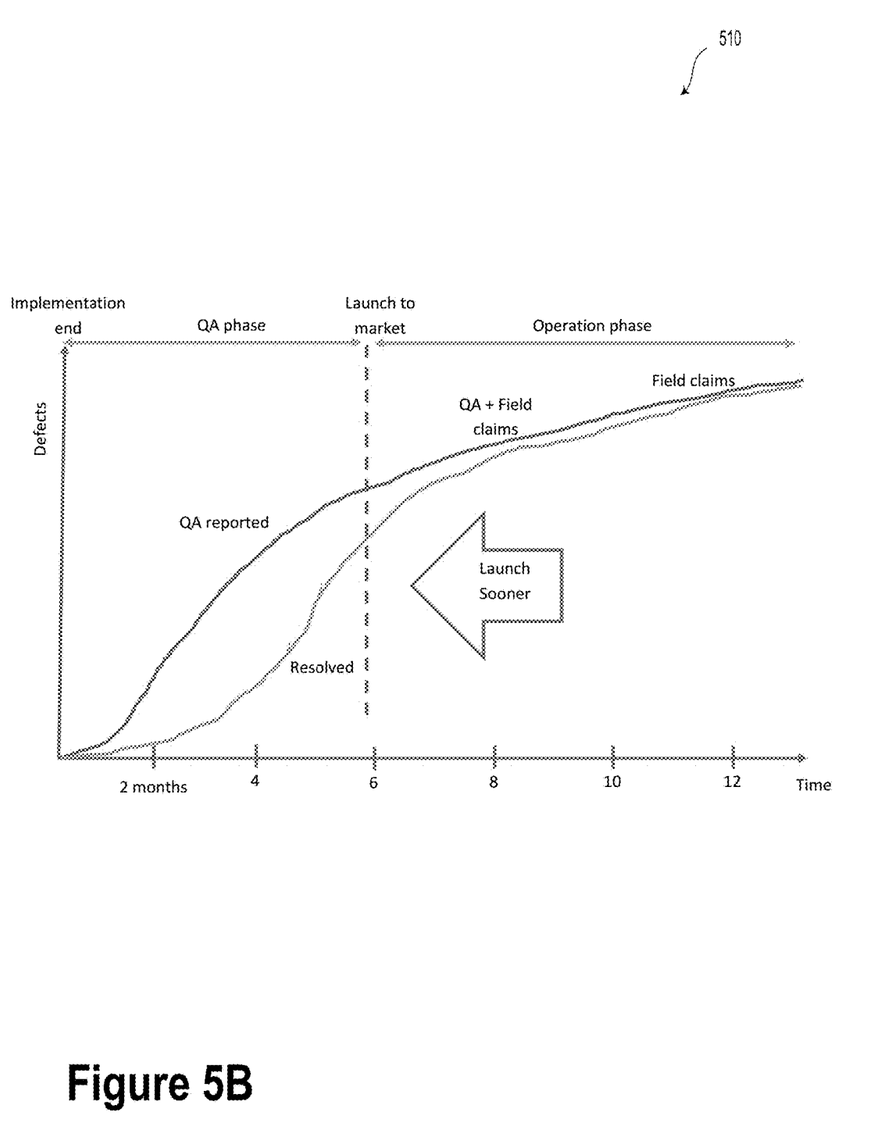
FIG. 5B illustrates a reported and resolved product defects versus time graph, according to an example embodiment.

FIG. 5B illustrates a reported and resolved product defects versus time graph 510, according to an example embodiment. Using the systems and methods described herein, a launch-to-market time could be decreased to, for example, six months after an initial shortened internal quality assurance period. Immediately after product launch, defect reports may come in via internal quality assurance as well as from the field. However, in response to the defect reports, the printing devices may be patched on a product-wide basis to prevent downtime among customers with a similar printing device. Over time, the defect reports may come exclusively, or substantially, from the field. In other words, by utilizing systems and methods herein, a printing device product could be released to the market in a much shorter amount of time, without need for as much internal, non-public quality assurance testing.

Figure 5C:
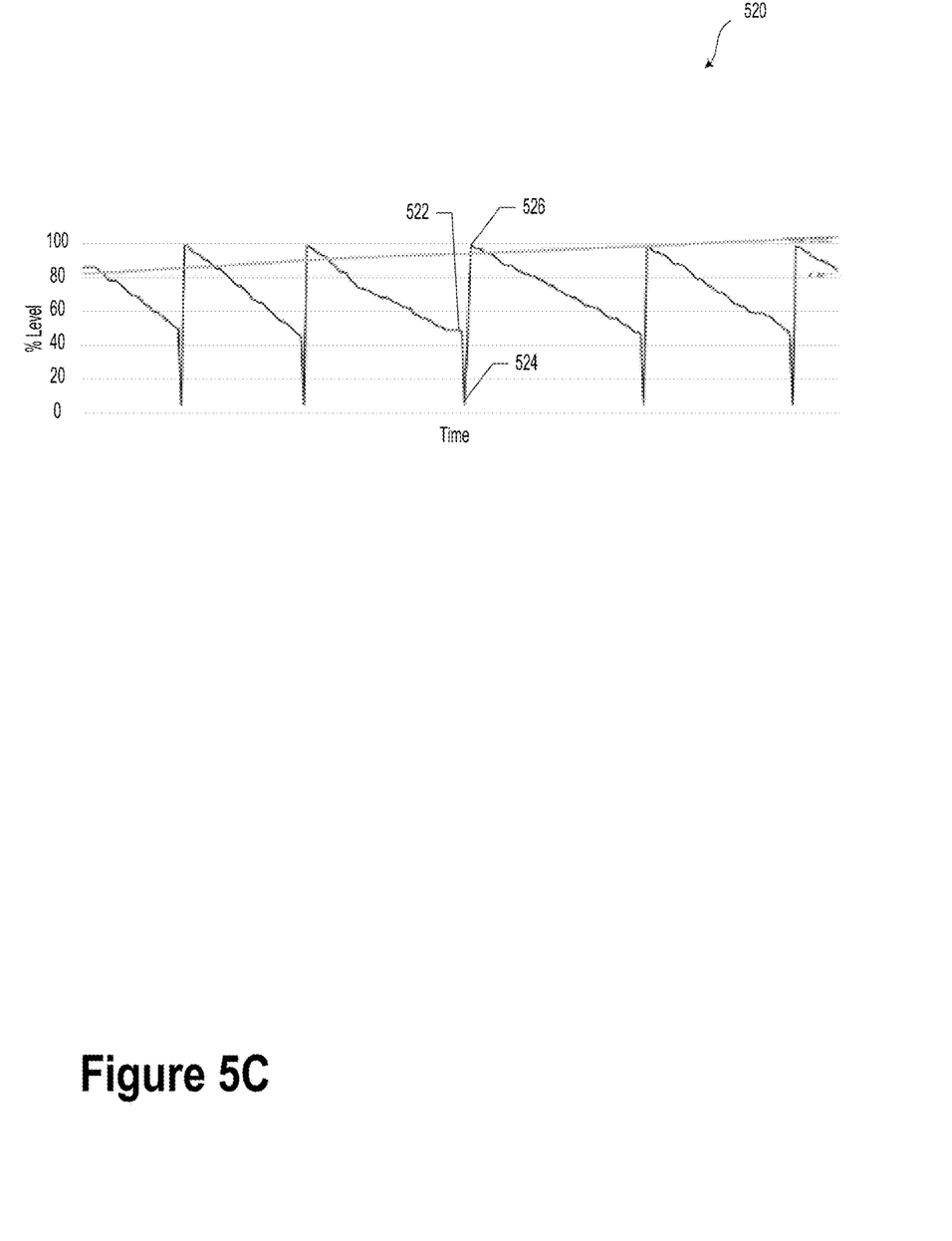
FIG. 5C illustrates a reported toner level versus time graph, according to an example embodiment.

FIG. 5C illustrates a reported toner level versus time graph 520, according to an example embodiment. Graph 520 illustrates several toner cartridge replacement cycles. In each case, the toner level data indicates a D-shape pattern. Specifically, graph 520 includes a low-point 522 that is not equal to zero or nearly so (in this case, it is approximately 48%) and a subsequent high-point 526 of about 100%, measured after consumable replacement. The D-shape may indicate an over-reporting of toner level (e.g., reporting 51% toner level when the actual toner level is less than 20%).

Furthermore, the D-shape may include a rapid drop between point 522 (e.g., 48%) to point 524 (e.g., 5%), and a return to point 526, after a toner cartridge replacement, substantially at 100%. In response to determining either a two-point or three-point D-shape from given printer device toner level data, a known measurement error may be determined.

Figure 5D:
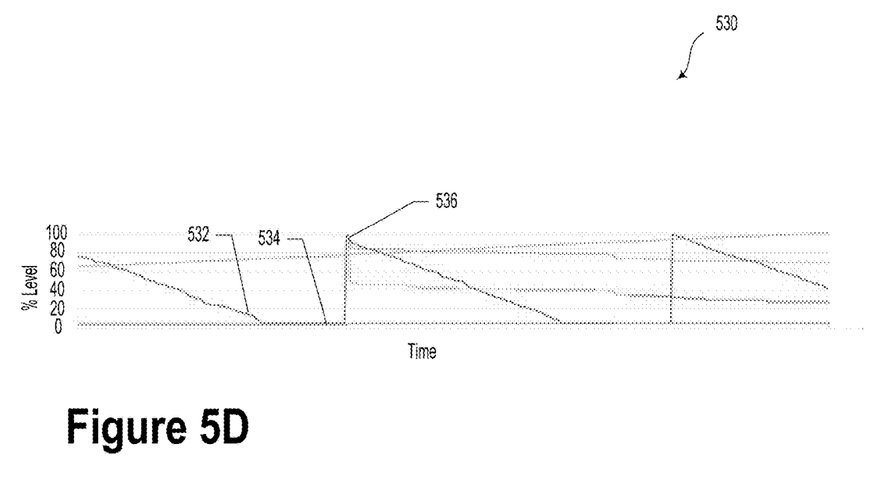
FIG. 5D illustrates a reported toner level versus time graph, according to an example embodiment.

FIG. 5D illustrates a reported toner level versus time graph 530, according to an example embodiment. Graph 530 illustrates an example of an L-shape that may indicate an underreporting of toner level from a given printer device (e.g., reporting 5% toner level when the actual toner level is 25%). The L-shape may be identified based on a relatively low measured toner level curve 532 followed by several days at a 6% level 534, and finally a return to approximately 100% when a new toner cartridge is installed.

Figure 5E:
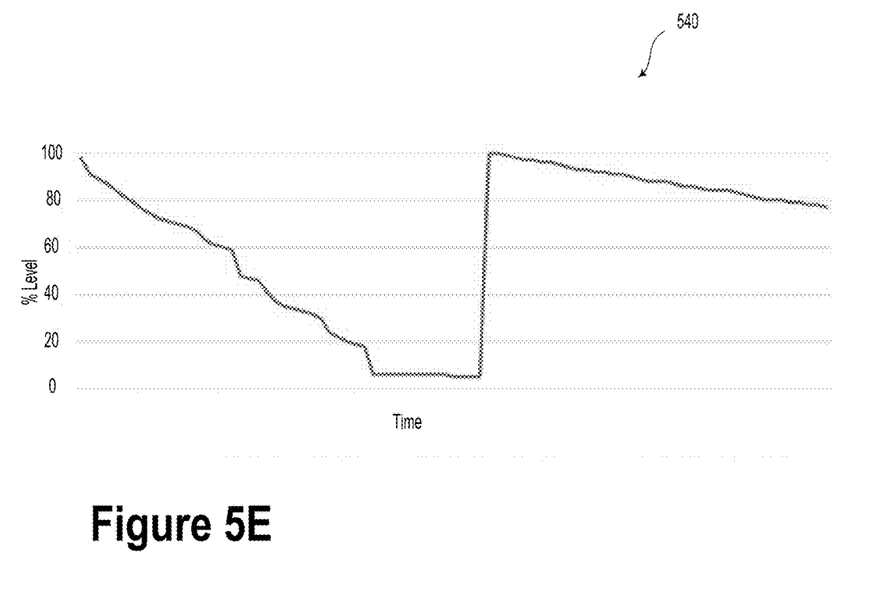
FIG. 5E illustrates a reported toner level versus time graph, according to an example embodiment.

FIG. 5E illustrates a reported toner level versus time graph 540, according to an example embodiment. Similar to graph 530, graph 540 illustrates an example of L-shaped toner data.

Figure 6:
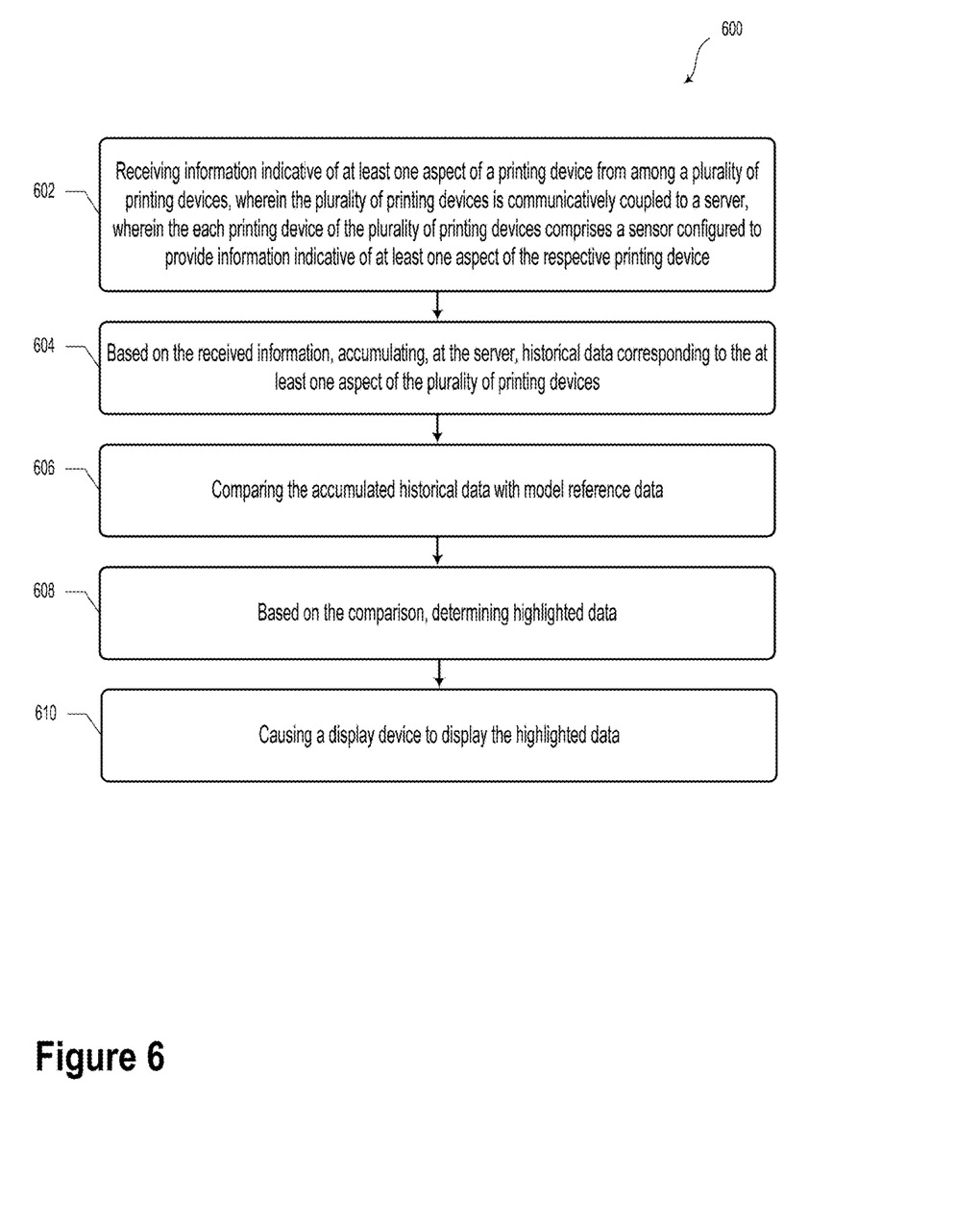
FIG. 6 illustrates a method, according to an example embodiment.

FIG. 6 illustrates a method 600, according to an example embodiment. Although method 600 is illustrated as including certain blocks that are carried out in a particular order, it will be understood that blocks may be added, subtracted, skipped, repeated, and/or carried out in a different order. Furthermore, some or all of the blocks of method 600 may be carried out by one or more elements of system 100 (e.g., controller 150, quality measurement service 140, and/or supply replenishment service 160) as illustrated and described in reference to FIG. 1. In some embodiments, some blocks of method 600 may be carried out, at least in part, by quality assurance personnel 170. Additionally, method 600 may include some or all elements of flowchart 300 and flowchart 400, as illustrated and described in reference to FIGS. 3 and 4.

Block 602 includes receiving information indicative of at least one aspect of a printing device from among a plurality of printing devices. The plurality of printing devices is communicatively coupled to a server. Each printing device of the plurality of printing devices includes a sensor configured to provide information indicative of at least one aspect of the respective printing device. In some embodiments, the sensor is configured to provide information indicative of a printing device toner level. However, as described elsewhere herein, many other different aspects of the printing devices are contemplated within the scope of the present disclosure.

Block 604 includes, based on the received information, accumulating, at the server, historical data corresponding to the at least one aspect of the plurality of printing devices.

Block 606 includes, comparing the accumulated historical data with model reference data. In an example embodiment, the model reference data could include extrapolated, simulated, and/or predicted information about one or more aspects of a given printing device. As such, the historical data record could be compared with model reference data in order to determine, for example, whether the given printing device is operating differently from other similar printing devices from the greater plurality of printing devices. Such comparisons may be used to determine whether one or more sensors are defective, inaccurate, or inoperable.

Block 604 includes, based on the comparison, determining highlighted data. The determined highlighted data may include large discrepancies between the historical data and the model reference data for the given printing device. Additionally or alternatively, the highlighted data could include information that is substantially similar between the historical data and the model reference data. Yet further, the highlighted data could include information in graph, text, statistical, or other formats. The highlighted data could be displayed differently from other information based on color, type face, line width, relative size, scale, etc.

Block 606 includes causing a display device to display the highlighted data. In some embodiments, the display device may be viewed by quality assurance personnel, who may in turn take action based on the displayed information. For example, the quality assurance personnel may select a corrective action from a plurality of possible actions. The corrective actions could include a variety of error compensation actions (e.g., toner level offset, toner rate usage offset/adjustment, etc.).

The display device could be configured to provide a visualization of the historical data, the model reference data, the highlighted data, and/or other types of information relating to the plurality of printing devices or the given printing device. The visualization could include, for example, one or more line graphs, histograms, pie charts, three-dimensional or multi-dimensional graphics, text, or other types of graphics that may provide a viewer with information about the relevant printing devices.

In some embodiments, method 600 may further include receiving information indicative of a shipment decision. In such scenarios, the method 600 may include, in response to the shipment decision, causing a supply replenishment service to initiate a replenishment action.

Additionally or alternatively, the method 600 may include receiving, from the supply replenishment service, information indicative of shipment decisions. In such a scenario, the shipment decisions include a last replacement date corresponding to at least one aspect of each respective printing device. The method 600 may further include partitioning the historical data into at least a training data set and a reference data set. As described elsewhere herein, the training data set includes historical data accumulated prior to a threshold date, and the threshold date is prior to the last replacement date. The reference data set includes historical data accumulated on or after the threshold date.

In some embodiments, method 600 could also include, based on the training data set, determining a predicted replacement date and comparing one or more actual shipment dates of the shipment decisions with the predicted replacement date. In such scenarios, the method 600 may also include, based on the comparison, determining a shipment error condition and an error type. In response to determining the shipment error condition, the method 600 may include adjusting at least one aspect of the supply replenishment service based on the error type.

Furthermore, in some embodiments, adjusting at least one aspect of the supply replenishment service may include determining a corrective action. In such scenarios, the corrective action could be configured to reduce or eliminate a difference between one or more future shipment dates and corresponding predicted replacement dates. As such, method 600 could also include one or more blocks corresponding to causing the server to distribute a patch to at least a target portion of the printing devices. In some embodiments, the patch may be operable to carry out the corrective action among the target portion of printing devices.

In some embodiments, method 600 yet further includes determining, based on an analysis of the historical data, a toner level measurement error condition. That is, based on the comparison with historical data, the methods and systems herein may determine that an error condition is present, possibly due to a malfunction or an under/over-reporting toner level sensor.

In response to determining the toner level measurement error condition, method 600 may include determining a corrective action. The corrective action may be configured, at least in part, to correct the toner level measurement error condition.

As an example, the method 600 may include causing the server to distribute a patch to at least a target portion of the printing devices. In such a scenario, the patch could be operable to carry out the corrective action among the target portion of printing devices.

As described elsewhere herein, in some embodiments, systems and methods may include comparing at least a portion of the historical data to a set of known measurement error patterns. For example, the set of known measurement error patterns may include a D-shaped toner level shape or an L-shaped toner level shape. In such scenarios, determining the toner level measurement error condition may be based, at least in part, on the comparison.

In such scenarios, method 600 may further include determining unusual toner data from the historical data. In such scenarios, the highlighted data include at least a portion of the unusual toner data. That is, in some embodiments, the highlighted data displayed to quality assurance personnel could be specifically arranged, colored, shaped, or sized to identify the unusual toner data.

In some embodiments, prior to causing the display device to display the highlighted data, method 600 may include applying a prefilter to the unusual toner data. In such scenarios, causing the display device to display the highlighted data may further include causing the display device to present a plurality of tiles. For example, the tiles could include graphical, text, and/or image-based tiles. In such a scenario, at least a portion of the plurality of tiles could be representative of the prefiltered unusual toner data.

Figure 7:
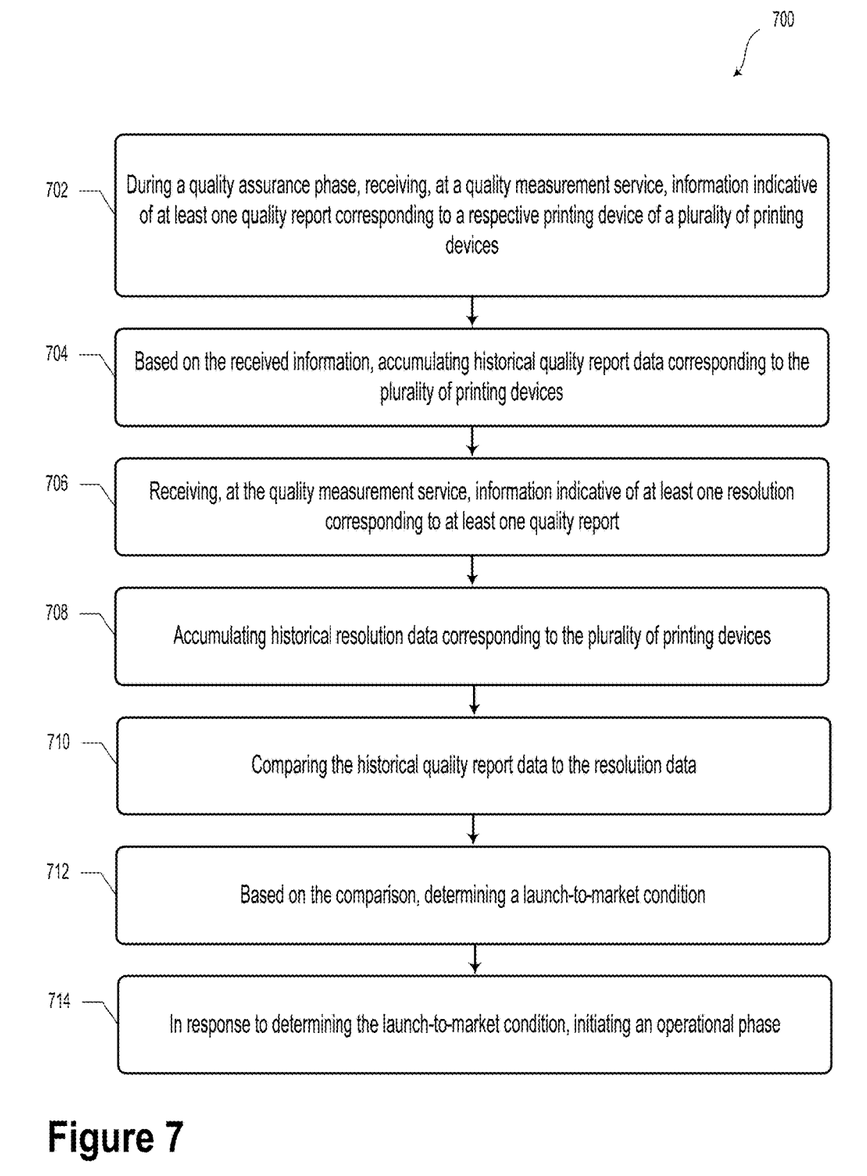
FIG. 7 illustrates a method, according to an example embodiment.

FIG. 7 illustrates a method 700, according to an example embodiment. Although method 700 is illustrated as including certain blocks that are carried out in a particular order, it will be understood that blocks may be added, subtracted, skipped, repeated, and/or carried out in a different order. Furthermore, some or all of the blocks of method 700 may be carried out by one or more elements of system 100 (e.g., controller 150, quality measurement service 140, and/or supply replenishment service 160) as illustrated and described in reference to FIG. 1. In some embodiments, some blocks of method 700 may be carried out, at least in part, by quality assurance personnel 170. Additionally, method 700 may include some or all elements of flowchart 300 and flowchart 400, as illustrated and described in reference to FIGS. 3 and 4. Furthermore, method 700 may relate to graphs 500 and 510, as illustrated and described in reference to FIGS. 5A and 5B.

In a conventional testing scenario, a manufacturer may release a printing device product after such devices print approximately 100,000 pages over several weeks. The internal testing may focus, for example, first on major (e.g., "urgent" or "show-stopper") defects, and later on minor defects (slight page count errors, etc.). Thereafter, once most defects are resolved, the printing devices may be launched among the general public.

The present disclosure may provide a faster launch to the public based on aggregation of information about defects and corresponding resolutions in the printing devices. That is, in some embodiments, a given printing device model may undergo an initial internal test phase of 80,000 printed pages and then be released to the public. In such a scenario, once released to the general public, the printing devices may be monitored via periodic or aperiodic reporting to a quality measurement service (e.g., quality measurement service 140). The quality measurement service may provide quality assurance personnel 170 with information regarding predicted defects that may include, for instance, under- or over-reporting of toner level or other consumable items. In response to determining defects (either automatically or as triggered by quality assurance personnel 170), patches may be released to the printing devices so as to resolve the defects.

In most cases, systems and methods herein may resolve the defects before they manifest in most printing devices. For example, patches could be released within minutes, hours, or days of determining an actionable defect (e.g., correctable via a software or firmware patch). As such, perhaps only one or a few users may notice actual issues. The other users (e.g., the vast majority of users) may receive the patches and resulting resolution before experiencing actual issues. As such, the systems and methods described herein may provide "proactive" defect resolution measures designed to reduce the time spent in internal testing as well as reduce overall downtime for printing device users.

Block 702 includes during a quality assurance phase, receiving, at a quality measurement service, information indicative of at least one quality report corresponding to a respective printing device of a plurality of printing devices. The quality report may include a performance summary received from a given printing device. The quality report may include information indicative of one or more defects in the given printing device. In other embodiments, quality assurance personnel or another element of system 100 could determine, for example based on multiple quality reports, that one or more defects are present in a given printing device and/or some or all of the plurality of printing devices (e.g., a product-wide problem).

The quality assurance phase could include one or more internal testing phases. In other embodiments, the quality assurance phase could additionally include a preliminary external testing phase (e.g., beta testing, limited product release/sale, not a full product release or sale, etc.).

Block 704 includes, based on the received information, accumulating historical quality report data corresponding to the plurality of printing devices. That is, the quality report data could be aggregated or otherwise collected so as to build up a historical record of printing device performance and/or defects.

Block 706 includes receiving, at the quality measurement service, information indicative of at least one resolution (or resolution event) corresponding to at least one quality report. In an example embodiment, the at least one resolution could include a resolution event of a given defect, which could relate, in turn to one or more quality reports.

Block 708 includes accumulating historical resolution data corresponding to the plurality of printing devices. In other words, based on receiving the information indicative of the individual resolution events, an aggregate historical record could be built up regarding the number, type, or other attributes of the resolution events.

Block 710 includes comparing the historical quality report data to the resolution data. In other words, various aspects of the historical quality report data and the resolution data may be analyzed. Such an analysis may be to determine the number of unresolved defects in the printing device or a rate of change of the unresolved defects in the printing device. The comparison could additionally or alternatively include historical quality report data and/or resolution data from other types (e.g., other models) of printing devices.

Block 712 includes, based on the comparison, determining a launch-to-market condition. In reference to graphs 500 and 510 as illustrated and described with regard to FIGS. 5A and 5B, a product launch could occur several months after the quality assurance phase has been initiated. The launch-to-market condition could be based on, for example, an aggregate number of resolution events, a difference between the number of reported defects and the number of resolution events, or a derivative of such a difference. Under such a scenario, if the rate of outstanding (e.g., unresolved) defects is decreasing, it may be a good indicator that most or all of the "major" problems with the printing devices have been resolved and that the printing device is ready for a launch to the market in general. By using systems and methods described herein, the launch-to-market condition may be achieved sooner than under conventional methods.

Block 714 includes, in response to determining the launch-to-market condition, initiating an operational phase. In some embodiments, the operational phase could include sales of the printing devices to the public or the market in general.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A system, comprising:
   a server;
   a display device;
   a plurality of printing devices communicatively coupled to the server, wherein each printing device of the plurality of printing devices comprises a sensor configured to provide information indicative of at least one aspect of the respective printing device; and
   a controller, wherein the controller comprises at least one processor and a memory, and wherein the at least one processor executes instructions stored in the memory so as to carry out operations, the operations comprising:
      receiving, at a quality measurement service, information indicative of the at least one aspect of the respective printing device from at least a portion of the plurality of printing devices;
      based on the received information, accumulating historical data corresponding to the at least one aspect of the plurality of printing devices;
      comparing the accumulated historical data with model reference data;
      based on the comparison, determining highlighted data; and
      causing the display device to display the highlighted data.

2. The system of claim 1, wherein the operations further comprise:
   receiving information indicative of a shipment decision; and
   in response to the shipment decision, causing a supply replenishment service to initiate a replenishment action.

3. The system of claim 1, wherein the operations further comprise:
   receiving, from the supply replenishment service, information indicative of shipment decisions, wherein the shipment decisions comprise a last replacement date corresponding to at least one aspect of each respective printing device; and
   partitioning the historical data into at least a training data set and a reference data set, wherein the training data set comprises historical data accumulated prior to a threshold date, wherein the threshold date is prior to the last replacement date, and wherein the reference data set comprises historical data accumulated on or after the threshold date.

4. The system of claim 3, wherein the operations further comprise:
   based on the training data set, determining a predicted replacement date;
   comparing one or more actual shipment dates of the shipment decisions with the predicted replacement date;
   based on the comparison, determining a shipment error condition and an error type; and
   in response to determining the shipment error condition, adjusting at least one aspect of the supply replenishment service based on the error type.

5. The system of claim 4, wherein the adjusting at least one aspect of the supply replenishment service comprises determining a corrective action, wherein the corrective action is configured to reduce or eliminate a difference between one or more future shipment dates and corresponding predicted replacement dates, wherein the operations further comprise:
   causing the server to distribute a patch to at least a target portion of the printing devices, wherein the patch is operable to carry out the corrective action among the target portion of printing devices.

6. The system of claim 1, wherein the operations further comprise:
   partitioning the historical data into at least a training data set and a reference data set, wherein the training data set comprises historical data accumulated prior to a threshold date, wherein the threshold date is prior to a subsequent date, and wherein the reference data set comprises historical data accumulated on or after the subsequent date
   based on the training data set, determining the model reference data, wherein comparing the accumulated historical data with the model reference data comprises comparing the model reference data with the reference data set; and
   based on the comparison, determining a reference data error condition and an error type, wherein the highlighted data corresponds to the reference data error condition.

7. The system of claim 1, wherein the sensor is configured to provide information indicative of a printing device toner level, wherein the operations further comprise:
   determining, based on an analysis of the historical data, a toner level measurement error condition;
   in response to determining the toner level measurement error condition, determining a corrective action, wherein the corrective action is configured to correct the toner level measurement error condition; and
   causing the server to distribute a patch to at least a target portion of the printing devices, wherein the patch is operable to carry out the corrective action among the target portion of printing devices.

8. The system of claim 7, wherein the operations further comprise:
   comparing at least a portion of the historical data to a set of known measurement error patterns, wherein the set of known measurement error patterns comprises a D-shaped toner level shape or an L-shaped toner level shape, wherein determining the toner level measurement error condition is based on the comparison.

9. The system of claim 7, wherein the operations further comprise:
   determining unusual toner data from the historical data, wherein the highlighted data comprises the unusual toner data; and prior to causing the display device to display the highlighted data, applying a prefilter to the unusual toner data.

10. The system of claim 9, wherein the highlighted data comprises a plurality of tiles, wherein at least a portion of the plurality of tiles is representative of the prefiltered unusual toner data.

11. The system of claim 7, wherein the corrective action comprises at least one of: adjusting a toner level offset point, adjusting a toner level usage slope, adjusting a dot-counting multiplier, adjusting a counter bit resolution, adjusting a page coverage multiplier, or adjusting a color printing multiplier.

12. A method comprising:
receiving information indicative of at least one aspect of a printing device from among a plurality of printing devices, wherein the plurality of printing devices is communicatively coupled to a server, wherein each printing device of the plurality of printing devices comprises a sensor configured to provide information indicative of at least one aspect of the respective printing device;
based on the received information, accumulating, at the server, historical data corresponding to the at least one aspect of the plurality of printing devices;
comparing the accumulated historical data with model reference data;
based on the comparison, determining highlighted data; and
causing a display device to display the highlighted data.

13. The method of claim 12, further comprising:
receiving information indicative of a shipment decision; and
in response to the shipment decision, causing a supply replenishment service to initiate a replenishment action.

14. The method of claim 12, further comprising:
receiving, from the supply replenishment service, information indicative of shipment decisions, wherein the shipment decisions comprise a last replacement date corresponding to at least one aspect of each respective printing device; and
partitioning the historical data into at least a training data set and a reference data set, wherein the training data set comprises historical data accumulated prior to a threshold date, wherein the threshold date is prior to the last replacement date, and wherein the reference data set comprises historical data accumulated on or after the threshold date.

15. The method of claim 14, further comprising:
based on the training data set, determining a predicted replacement date;
comparing one or more actual shipment dates of the shipment decisions with the predicted replacement date;
based on the comparison, determining a shipment error condition and an error type; and
in response to determining the shipment error condition, adjusting at least one aspect of the supply replenishment service based on the error type.

16. The method of claim 15, wherein adjusting at least one aspect of the supply replenishment service comprises determining a corrective action, wherein the corrective action is configured to reduce or eliminate a difference between one or more future shipment dates and corresponding predicted replacement dates, wherein the method further comprises:
causing the server to distribute a patch to at least a target portion of the printing devices, wherein the patch is operable to carry out the corrective action among the target portion of printing devices.

17. The method of claim 12, wherein the sensor is configured to provide information indicative of a printing device toner level, wherein the method further comprises:
determining, based on an analysis of the historical data, a toner level measurement error condition;
in response to determining the toner level measurement error condition, determining a corrective action, wherein the corrective action is configured to correct the toner level measurement error condition; and
causing the server to distribute a patch to at least a target portion of the printing devices, wherein the patch is operable to carry out the corrective action among the target portion of printing devices.

18. The method of claim 14, further comprising:
comparing at least a portion of the historical data to a set of known measurement error patterns, wherein the set of known measurement error patterns comprises a D-shaped toner level shape or an L-shaped toner level shape, wherein determining the toner level measurement error condition is based on the comparison.

19. The method of claim 14, further comprising:
determining unusual toner data from the historical data, wherein the highlighted data comprises the unusual toner data; and
prior to causing the display device to display the highlighted data, applying a prefilter to the unusual toner data, wherein causing the display device to display the highlighted data comprises causing the display device to present a plurality of tiles, wherein at least a portion of the plurality of tiles is representative of the prefiltered unusual toner data.

20. A method comprising:
during a quality assurance phase, receiving, at a quality measurement service, information indicative of at least one quality report corresponding to a respective printing device of a plurality of printing devices;
based on the received information, accumulating historical quality report data corresponding to the plurality of printing devices;
receiving, at the quality measurement service, information indicative of at least one resolution corresponding to at least one quality report;
accumulating historical resolution data corresponding to the plurality of printing devices;
comparing the historical quality report data to the resolution data;
based on the comparison, determining a launch-to-market condition; and
in response to determining the launch-to-market condition, initiating an operational phase.

* * * * *